United States Patent

Balasubramanian et al.

[11] Patent Number: 6,026,487
[45] Date of Patent: Feb. 15, 2000

[54] COMPUTER PROGRAM PRODUCT AND METHOD FOR EFFICIENTLY SELECTING ONE ACTION FROM AMONG ALTERNATIVE ACTIONS

[75] Inventors: Kumar Balasubramanian, Chandler; Seth Abraham, Gilbert, both of Ariz.

[73] Assignee: Intel Corporation, Santa Clara, Calif.

[21] Appl. No.: 09/069,006

[22] Filed: Apr. 28, 1998

[51] Int. Cl.[7] .................................................... G06F 9/40
[52] U.S. Cl. ............................................................ 712/233
[58] Field of Search ............................................. 712/233

[56] References Cited

U.S. PATENT DOCUMENTS

| | | | |
|---|---|---|---|
| 4,294,155 | 10/1981 | Turner | 84/682 |
| 5,210,870 | 5/1993 | Baum et al. | 707/7 |
| 5,450,338 | 9/1995 | OOta et al. | 708/200 |
| 5,913,049 | 6/1999 | Shiell et al. | 712/215 |

*Primary Examiner*—David Y. Eng
*Attorney, Agent, or Firm*—Blakely, Sokoloff, Taylor & Zafman LLP

[57] ABSTRACT

A computer program product and method for efficiently selecting one action from among alternative actions are disclosed. The computer program product includes a computer readable medium for storing instructions, which, when executed by a computer, cause the computer to efficiently select one action, from among alternative actions. The selection is based on the value of a selection key, and includes comparing the selection key to values corresponding to alternative actions, and obtaining for each comparison a match or no match indication, and making a number of such comparisons in parallel. The computer then is made to logically AND those indications with an equal quantity of corresponding values, in parallel, to create index indications. The computer then is made to reduce the multiple index indications and to produce in a register a single value corresponding to the selected action or to a default action. The computer is then made to branch to the selected action identified by the value in the register. Eliminated are the multiple branches required by known prior art computer controlling techniques, thereby enhancing performance.

26 Claims, 6 Drawing Sheets

6,026,487

COMPUTER PROGRAM PRODUCT AND METHOD FOR EFFICIENTLY SELECTING ONE ACTION FROM AMONG ALTERNATIVE ACTIONS

BACKGROUND OF THE INVENTION

1. Field of the Invention

This invention relates generally to computers, and more particularly to computer program products and methods for causing a computer to function in a particular efficient fashion.

2. Description of the Related Art

Modern computers contain microprocessors, which are essentially the brains of the computer. In operation, the computer uses the microprocessor to run or execute a computer program.

The computer program might be written in a high-level computer language, such as Pascal or C or C++, using statements similar to English, which statements are then translated (by another program called a compiler) into numerous machine-language instructions. Or the program might be written in assembly language, and then translated (by another program called an assembler) into machine-language instructions. In practice, every computer language above assembly language is a high-level language. (See Computer Dictionary (Microsoft Press, 3rd ed. 1997) for definitions of terms such as high-level language, branch instruction, branch prediction, case statement, and pipelining used herein.)

A computer program contains numerous instructions, which tell the computer what precisely it must do, to achieve the desired goal of the program. The computer runs a particular computer program by executing the instructions contained in the program in sequential order.

One type of instruction frequently contained in a computer program is a branch instruction. Some programs contain many branch instructions. A branch instruction is an assembly or machine-level instruction that transfers control to an instruction other than the next instruction in sequence, usually based on some condition, that is, it transfers control if a specific condition is true or false. Branch instructions cause the microprocessor to jump forward or backward in the computer program instruction code, to a particular branch in the program where the next instruction to be executed is located.

Knowing where the next instruction to be executed is located is necessary for fetching and decoding that instruction. Pipelining is a method used in some microprocessors of fetching and decoding instructions in which, at any given time, several program instructions are in various stages of being fetched or decoded. Ideally, pipelining speeds execution time by insuring that the microprocessor does not have to wait for instructions; when it completes execution of one instruction, the next is ready and waiting in the pipeline. A pipeline is a technique in which the output of one process serves as input to a second, the output of the second process serves as input to a third, and so on. In order to have the next instruction that is to be executed ready and waiting in the pipeline, the microprocessor somehow must predict what that instruction will be.

Branch prediction is a technique used in some microprocessors to guess whether or not a branch will be taken in a program, and to fetch executable code from the appropriate location. When a branch instruction is executed, it and the next instruction executed are stored in a buffer. This information is used to predict which way the instruction will branch the next time it is executed. When the prediction is correct, the program executes efficiently. When the prediction is incorrect, program execution is slowed down by the need to retrieve the next instruction. Such incorrect predictions are sometimes called branch mispredictions.

Various high-level computer program languages, such as Pascal, C, and C++, use a type of control statement that executes one of several sets of instructions based on some key value. This type of control statement is sometimes called a switch statement or a case statement (both names are used interchangeably herein), and the key is sometimes called a selection key.

Case statements are used in evaluating situations that can have a number of different results. A case statement functions like a series of IF-THEN type of conditional statements (that is, if A, then do this; else if B, then do that; else . . . ). In a case evaluation, a variable (such as a number or a string of characters) is compared against one after another of a series of constants assigned by the programmer. The variable is the selection key, and each constant represents a different case and defines an action to be carried out. When the program finds a constant that matches the variable, it carries out whatever action is dictated by the case in which the match occurs.

In the C computer language, for example, the code for a case statement might look as set forth below, in which the variable is "selection_key", and the constants are 3, 109, 12, and 63.

```
switch (selection_key)
{
case 3:
    /* action to perform when selection_key is 3 */
case 109:
    /* action to perform when selection_key is 109 */
case 12:
    /* action to perform when selection_key is 12 */
case 63:
    /* action to perform when selection_key is 63 */
default:
    /* action to perform when selection_key
    does not match any alternative    */
}
```

In this example, the cases are case 3, case 109, case 12, and case 63. The numbers 3, 109, 12, and 63 are sometimes called case values. The case values, and the case statement, are said to be sparse, if the maximum case value minus the minimum case value is much greater than the number of case values. In this example, the maximum case value (109) minus the minimum case value (3) is 106, which is much greater than the number of case values (4); consequently these cases and this case statement are sparse.

When the case statement is not sparse, an efficient technique, known as a jump table, can be constructed and used to achieve the intended results of the case statement. When the case statement is sparse jump tables are impractical; consequently other techniques are used. Two known commonly used techniques to implement a sparse case statement are the linear technique and the binary tree technique.

The linear technique for a case statement is, essentially, a linear sequence of compares and jump conditions for each case. FIG. 1 illustrates a linear prior art technique, and the code for the illustrated linear technique is set forth below. The number of instructions executed in the code for such a linear technique is directly proportional to the number of possible cases.

```
cmp selection_key, 3
je action_for_3
cmp selection_key, 109
je action_for_109
cmp selection_key, 12
je action_for_12
cmp selection_key, 63
je action_for_63
default_action:
```

The binary tree technique for a case statement is, essentially, a tree-like arrangement of compares and jump conditions. FIG. 2 illustrates a binary tree prior art technique, and the code for the illustrated binary tree is set forth below. The number of instructions executed in the code for such a binary tree is directly proportional to the log (the logarithm to the base 2) of the number of cases.

```
cmp selection_key, 12
jg right_side
je action_for_12
cmp selection_key, 3
jg action_for_3
jmp default_action
right_side:
    cmp selection_key, 109
    jg default_action
    je action_for_109
    cmp selection_key, 63
    je action_for_63
default_action:
```

Each of these prior art techniques contain multiple branches and multiple branch instructions (the je and jg and jmp jump statements). Since, in general, the input data is random, it is difficult to predict these branches correctly. Consequently, branch misprediction in each of these techniques can result in slowing down the system. The more branches, the greater the likelihood of branch mispredictions, and the greater the likelihood of slowing down the computer system because of the need to retrieve the next instruction to be executed.

Thus, the present invention is directed to overcoming, or at least reducing, the effects of one or more of the problems mentioned above.

SUMMARY OF THE INVENTION

In one aspect of the present invention, provided is a computer readable medium for storing instructions, which when executed by a computer, causes the computer to efficiently select one action, from among alternative actions, based on the value of a selection key, by performing certain steps. The steps include comparing a selection key with at least two values corresponding to alternative actions, making the comparisons in parallel, and creating for each such comparison a match or no match indication. The steps include logically ANDing the indications resulting from the comparing step with an equal quantity of values corresponding to consecutive index numbers, and creating for each such logical ANDing an index indication. The steps also include logically ORing each of the index indications, and producing an index corresponding to the selected action or to a default action, and then branching to the action identified by that index.

BRIEF DESCRIPTION OF THE DRAWINGS

Other objects and advantages of the invention will become apparent upon reading the following detailed description and upon reference to the drawings in which.

Figure 1:
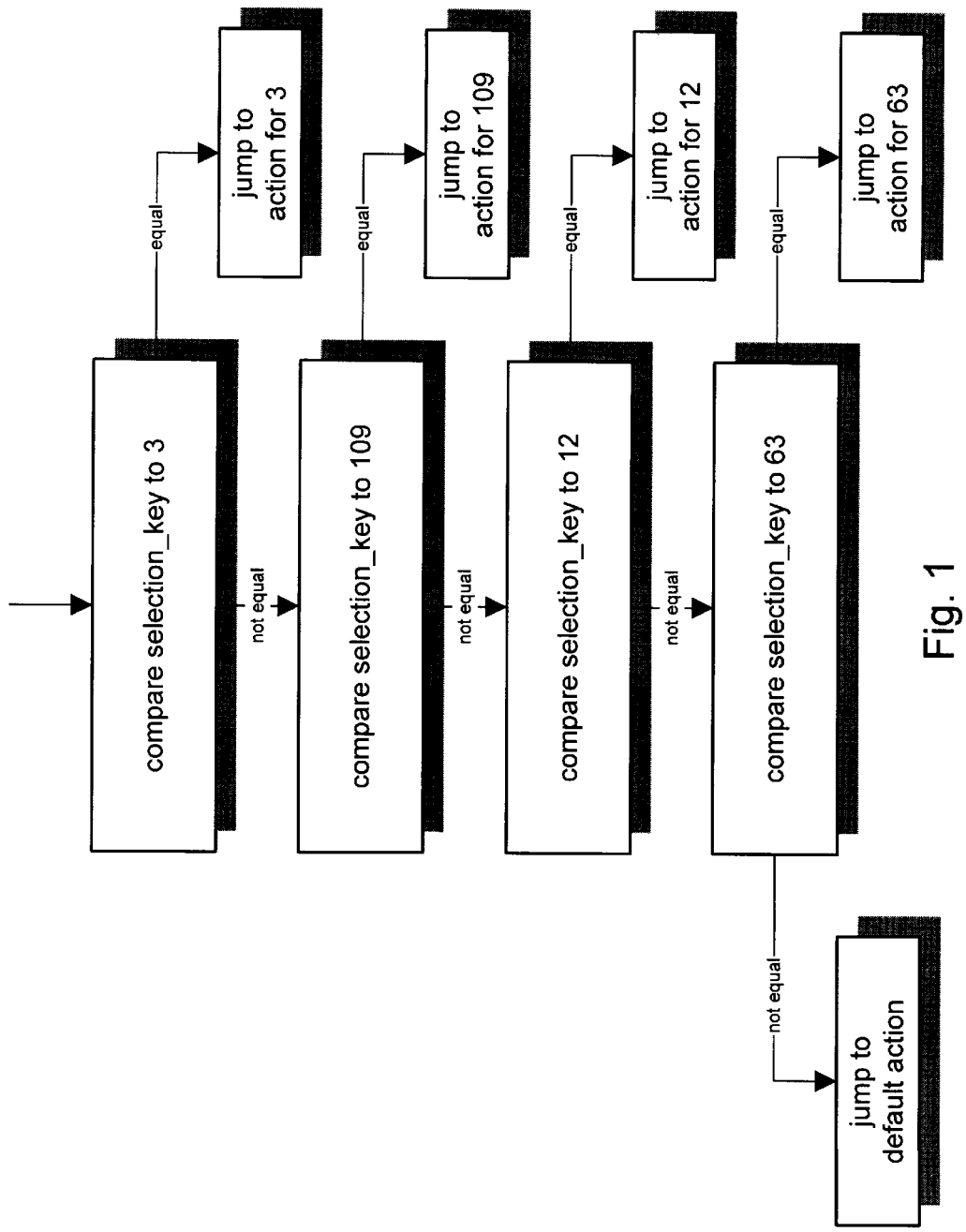
FIGS. 1 and 2 illustrate known prior art methods.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention eliminates branch mispredictions caused by the numerous branches in the known prior art techniques. Moreover, when used with modem microprocessors, such as the Pentium II® microprocessor and the Pentium® microprocessor with MMX® technology manufactured by Intel Corporation, that are capable of performing certain operations in parallel, the present invention permits execution of case statements in parallel, and execution of case statements interleaved with the execution of other instructions. Such parallel operation cannot be achieved with the known prior art linear technique or prior art binary tree technique, even when using modem microprocessors, because of the multitude of branches inherently contained in those prior art methods.

Figure 2:
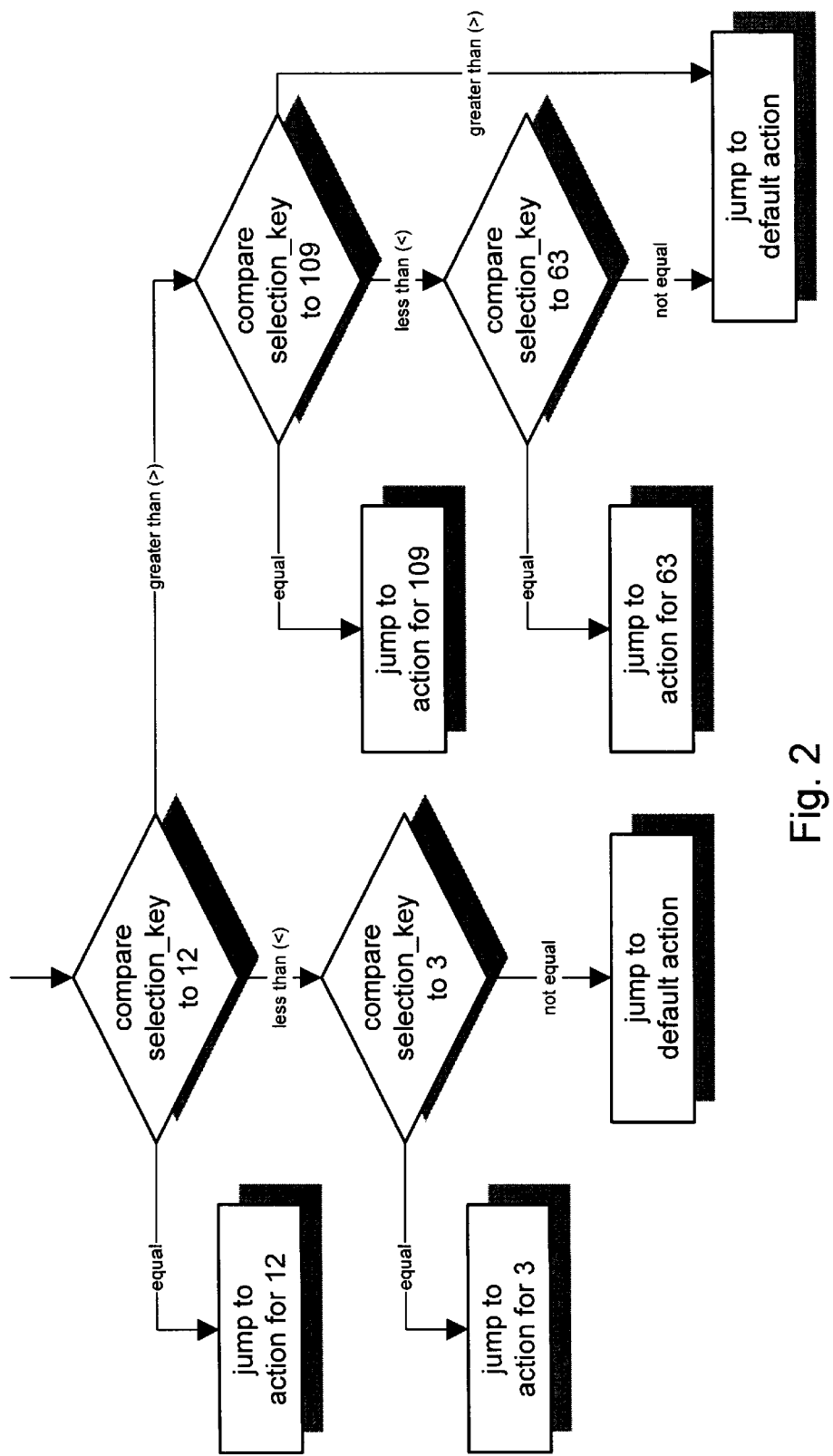
Figure 3:
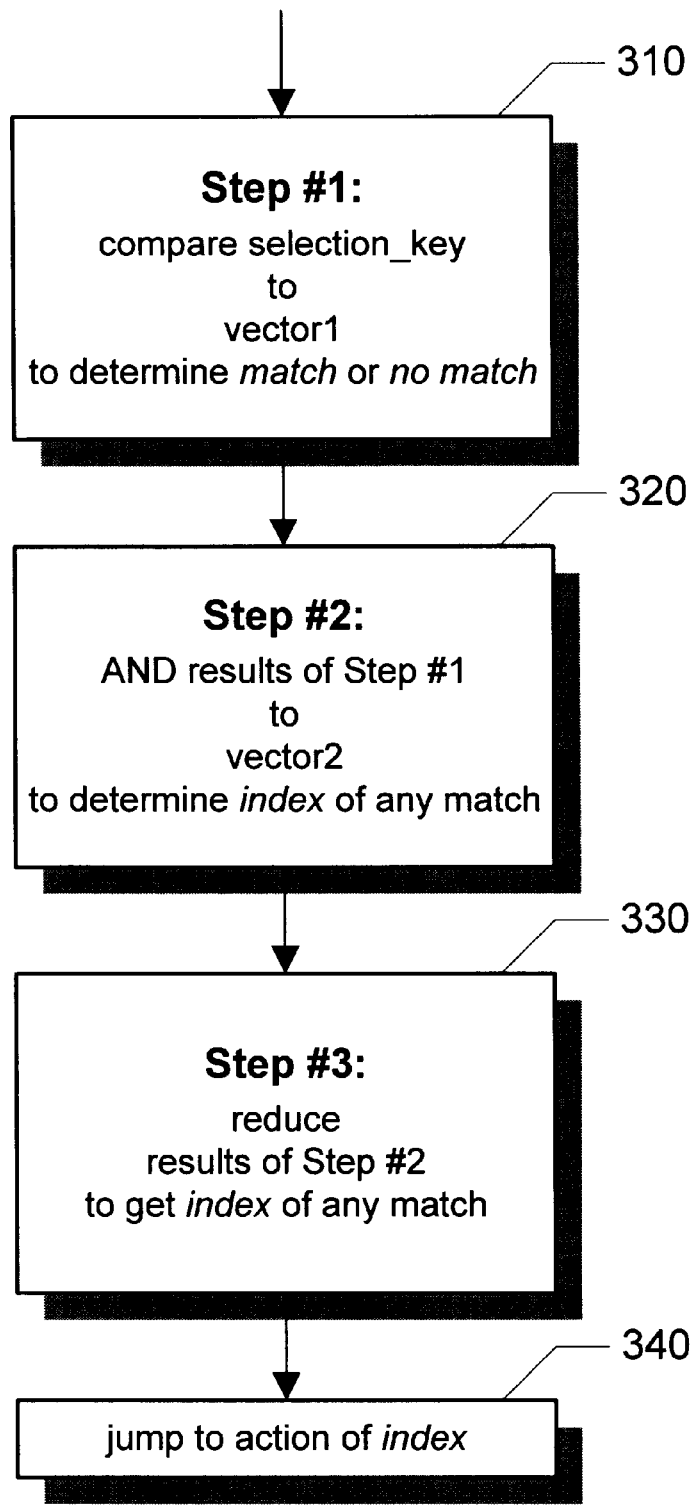
FIG. 3 illustrates one aspect of a method according to one embodiment of the present invention.

Referring now to the drawings, and in particular to FIG. 3, shown, in block diagram form, is a method for causing a computer to efficiently select one action, from among many alternative actions, according to one aspect of the present invention. As illustrated in FIG. 3, the method has a straight-through process flow, flowing from step #1 denoted by reference numeral 310, to step #2 denoted by reference numeral 320, to step #3 denoted by reference numeral 330, and then to the final step denoted by reference numeral 340. Only the final step, the step denoted by reference numeral 340, is a branch step; that is, only the final step includes a branch instruction or jump statement. Because the steps denoted by reference numerals 310, 321, and 330 contain no branches, branch mispredictions can not occur. Contrast this to the prior art linear method and the prior art tree method, illustrated in FIGS. 1 and 2, respectively, which contain a multitude of branches.

According to one aspect of the present invention, the method illustrated in FIG. 3 causes the computer to efficiently execute a case statement. Prior to execution, at compile time, two vectors are constructed for use by the computer during execution. One vector contains case values, and the other vector contains consecutive vector index numbers. Using the same example illustrated in FIGS. 1 and 2 for the prior art methods, according to the present invention the first vector, vector1, would contain the values 3, 109, 12, 63—the four case values—and the second vector, vector2, would contain the consecutive vector indexes 1, 2, 3, 4—because there are four case values.

During execution, a variable—the selection key—is received and, based on that selection key, the computer selects one action from among numerous alternative actions. With continued reference to FIG. 3, the present invention causes the computer to compare the selection key with vector1, to determine whether the selection key matches, or does not match, the elements contained in vector1. In modem, sophisticated microprocessors, using SIMD (Single Instruction Multiple Data stream) technology, numerous such comparisons can be executed in parallel. In a microprocessor having 64-bit wide registers, comparisons can be made, in parallel, on eight 8-bit data elements, on four 16-bit data elements, and so forth. Since in the foregoing example there are four case statements, assume, for the examples that follow, that each data element of vector1 and of vector2 is a 16-bit data element, and the selection key is a 16-bit data element.

In the second step of the method illustrated in FIG. 3, step #2, the results of the first step, the compare step, are logically ANDed with vector2, to determine the index of any match. Using SIMD technology, a plurality of these ANDing operations can be carried out in parallel.

The next step of the method illustrated in FIG. 3, step #3, includes reducing the results obtained in step #2, to get the index of any match. Step #3 yields the index of the required action, an index of zero, by definition, indicating that a default action is to be taken. This index is placed in a register, and used to control where the computer branches to for its next instruction.

Using MMX® technology available from Intel Corporation, sample code for controlling a computer according to the method illustrated in FIG. 3 is set forth below, for the same example as used in FIGS. 1 and 2.

```
line 1   movd mm0, selection_key   ; get the 16 bit selection key
                                   ; mm0 = [0 0 key key]
line 2   punpcklwd mm0, mm0        ; mm0 = [0 0 key key]
line 3   punpckldq mm0, mm0        ; mm0 = [key key key key]
line 4   movq mm1, vector1
line 5   pcmpeqw mm1, mm0          ; compares to 4 cases (in parallel)
line 6   pand mm1, vector2         ; get indexes of any matches
line 7   movq mm2, mm1             ; begin the (OR) reduction
line 8   psrlq mm1, 32
line 9   por mm1, mm2
line 10  movq mm2, mm1
line 11  psrlq mm1, 16
line 12  por mm1, mm2              ; the required index is in low 16
                                   bits
line 13  movd eax, mm1
line 14  jmp jump_table[eax]       ; jump to the desired action
line 15  jump_table: default_action, action_for_3,
         action_for_109, action_for_12, action_for_63
```

Line numbers have been added to the above sample code for easy reference to particular code lines. Other code of course can be used to obtain the same results, as will be apparent to those skilled in the art after having had benefit of the description contained herein.

Table 1 helps illustrate the method of FIG. 3 for the previous example, for a selection key equal to 7, and Table 2 does the same for a selection key equal to 3, as described more fully below.

TABLE 1

|  | data element 1 | data element 2 | data element 3 | data element 4 |
|---|---|---|---|---|
| vector1: | 0000000000000011 | 0000000001101101 | 0000000000001100 | 0000000000111111 |
| vector2: | 0000000000000001 | 0000000000000010 | 0000000000000011 | 0000000000000100 |
| selection_key: | 0000000000000111 | 0000000000000111 | 0000000000000111 | 0000000000000111 |
| step #1: compare selection_key with vector1 to determine match or no match |  |  |  |  |
| vector1 | 0000000000000011 | 0000000001101101 | 0000000000001100 | 0000000000111111 |
| selection_key: | 0000000000000111 | 0000000000000111 | 0000000000000111 | 0000000000000111 |
| step #1 results | 0000000000000000 | 0000000000000000 | 0000000000000000 | 0000000000000000 |
|  | (no match) | (no match) | (no match) | (no match) |
| step #2 .AND. results of step #1 with vector2 to determine index of any match |  |  |  |  |
| step #1 results: | 0000000000000000 | 0000000000000000 | 0000000000000000 | 0000000000000000 |
| vector2: | 0000000000000001 | 0000000000000010 | 0000000000000011 | 0000000000000100 |
| step #2 results: | 0000000000000000 | 0000000000000000 | 0000000000000000 | 0000000000000000 |
| step #3: reduce results of step #2 to get index of any match |  |  |  |  |
| step #2 results: | 0000000000000000 | 0000000000000000 | 0000000000000000 | 0000000000000000 |
| step #3 results: | 0000000000000000 |  |  |  |

Each of Tables 1 and 2 contain four sections: the first section sets forth the data elements of vector1, vector2, and the selection key; the second section sets forth the data elements with respect to step #1; the third section sets forth the data elements with respect to step #2; and the fourth section sets forth the data elements with respect to step #3.

data elements 2, 3, and 4, and is the value of the index of the vector1 element that matches the selection key in data element 1.

TABLE 2

|  | data element 1 | data element 2 | data element 3 | data element 4 |
|---|---|---|---|---|
| vector1: | 0000000000000011 | 0000000001101101 | 0000000000001100 | 0000000000111111 |
| vector2: | 0000000000000001 | 0000000000000010 | 0000000000000011 | 0000000000000100 |
| selection_key: | 0000000000000011 | 0000000000000011 | 0000000000000011 | 0000000000000011 |
| step #1: compare selection_key with vector1 to determine match or no match | | | | |
| vector1: | 0000000000000011 | 0000000001101101 | 0000000000001100 | 0000000000111111 |
| selection_key: | 0000000000000011 | 0000000000000011 | 0000000000000011 | 0000000000000011 |
| step #1 results: | 1111111111111111 | 0000000000000000 | 0000000000000000 | 0000000000000000 |
|  | (match) | (no match) | (no match) | (no match) |
| step #2: .AND. results of step #1 with vector2 to determine index of any match | | | | |
| step #1 results: | 1111111111111111 | 0000000000000000 | 0000000000000000 | 0000000000000000 |
| vector2: | 0000000000000001 | 0000000000000010 | 0000000000000011 | 0000000000000100 |
| step #2 results: | 0000000000000001 | 0000000000000000 | 0000000000000000 | 0000000000000000 |
| step #3: reduce results of step #2 to get index of any match | | | | |
| step #2 results: | 0000000000000001 | 0000000000000000 | 0000000000000000 | 0000000000000000 |
| step #3 results: | 0000000000000001 | | | |

Referring now to Table 1, vector1 contains four elements, which are the case values of the case statement to be executed. In our example, vector1 contains four data elements, each 16-bits long, with their values being 3, 109, 12, and 63. These values are set forth in binary form in the columns labeled data element 1, data element 2, data element 3, and data element 4, respectively. Since in this example there are only four case values, vector2, which contains consecutive vector index numbers, contains the numbers 1, 2, 3, and 4. In our example the selection key is equal to the number 7; consequently, the value 7, in binary form, is contained in each of data elements 1, 2, 3, and 4, so that the selection key can be compared to each of the four elements of vector1, in parallel, during step #1. The getting or receiving of the 16-bit selection key, and the placing of the value of the key in four data element positions, is carried out by the first three lines of the MMX® technology code set forth above.

With continued reference to Table 1, in step #1 of the present method, the selection key is compared to each of the four elements of vector1, in parallel, to determine whether any matches exist. This is carried out in the fifth line of the MMX® technology code set forth above. The result of each step #1 comparison is either a match or a no match indication. For the example set forth in Table 1, having a selection key equal to 7, there is no match of the selection key to any of the elements contained in vector1, and therefore the result of step #1 in each of the four data elements is a series of zeros. For the example of Table 2, where the selection key is equal to 3, there is a match for data element 1, and no match for data elements 2, 3, and 4; consequently, the result for step #1 in data element 1 is a series of ones, and in each of the remaining three data elements is a series of zeros.

In the next step, step #2, the results of step #1 are logically ANDed with vector2, to determine the index of any match. This step is carried out in the sixth line of the MMX® technology code set forth above. In Table 1, where the selection key is equal to 7, the results of step #2 are zeros in each of the four data elements. In Table 2, where the selection key is equal to 3, the results of step #2 are zeros in The result of step #2 is four data elements, because four data elements have been compared, in parallel, with the selection key in this example. These data elements are either all zero, or one of them is non-zero, because there can be at most only one match. Step #3 takes the multiple data elements and reduces them to a single data element containing either the single non-zero value that resulted from step #2 or, if there was no such non-zero value, zero. This reduction is carried out by the seventh through twelfth lines of the MMX® technology code set forth above. The thirteenth line of code moves the result of step #3 to a particular register, which register is used in the fourteenth and fifteenth lines of code to branch to the selected action. For the example of Table 1, where the selection key does not match any element in vector1, the selected action is the default action because the value in the register is zero. For the example of Table 2, where the selection key is 3 and therefore matches the first element in vector1, the value in the register causes the computer to branch to the action for that selected case.

For illustrative purposes, the above example dealt with only four alternative actions. The present invention also can be advantageously used with a greater quantity of desired actions. The above example dealt with four 16-bit data elements. The present invention also can be advantageously used for data elements that are 8-bit data elements or bytes or 32-bit integers or any other data structure. The limitation is the width of the registers. In present day sophisticated microprocessors, that width is 64-bits wide. This invention is equally applicable to wider registers, and to narrower registers. As will be apparent, the entire width of a register need not be used.

Figure 4:
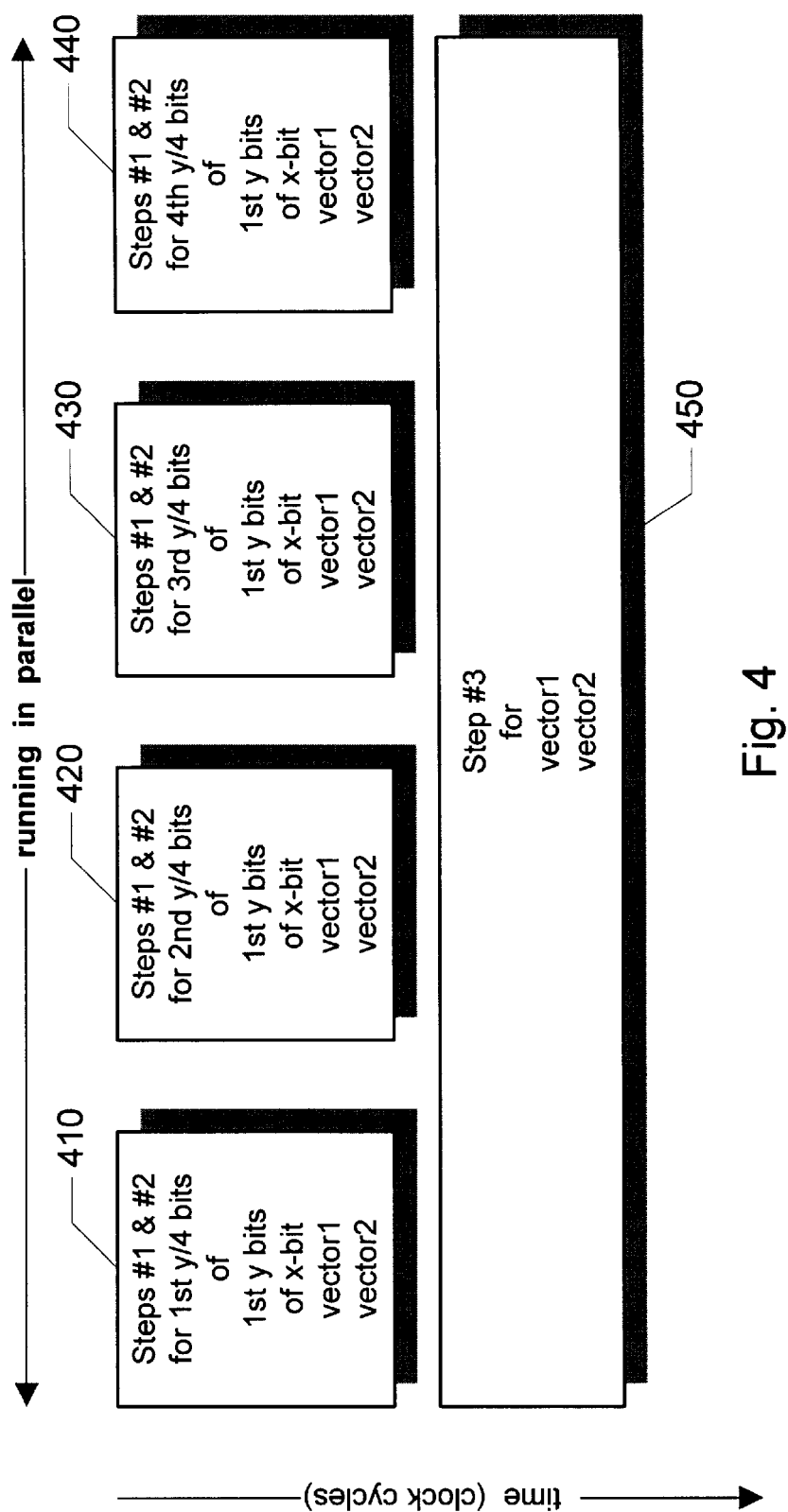
FIG. 4 illustrates parallel processing of a case statement according to one aspect of the present invention.

When used for a greater quantity of cases, vector1 still contains all the case numbers, and vector2 still contains consecutive index numbers, accordingly to one embodiment of the present invention. FIG. 4 illustrates steps #1, #2, and #3 of the present method for such a greater quantity of cases, namely the quantity x, with each of vector1 and vector2 having x elements. As illustrated in FIG. 4, steps #1 and #2 are carried out in parallel for the first y bits of vector1 and vector2. This process is repeated for the next y bits of vector1 and vector2, and so forth until all x bits have been used. Then the final step of FIG. 3, denoted by reference numerical 340, is carried out. As will be apparent to those skilled in the art, portions of step #3 may be carried out in parallel with steps #1 and #2; additionally, portions of step #3 itself may be carried out in parallel.

As illustrated in FIG. 4, each of the boxes denoted by reference numerals 410, 420, 430, and 440 perform steps #1 and #2 on the first, second, third, and fourth y/4 bits of the first y bits of vector1 and vector2, in parallel; in the example set forth above in Tables 1 and 2, x and y were each equal to 64, and y/4 was equal to 16.

The method illustrated in FIG. 4 is first carried out for the first y bits of vector1 and vector2. When it is being carried out, however, all computer clock cycles might not be used for execution of the method. For example, in the MMX® technology code set forth above, the eighth line of code might take far more than one clock cycle to complete, and consequently numerous clock cycles might occur between execution of the eighth line of code (psrlq mm1, 32) and execution of the ninth line of code (por mm1, mm2). During that dead-time, according to another aspect of the present invention, other instructions may be advantageously executed by the computer.

Figure 5:
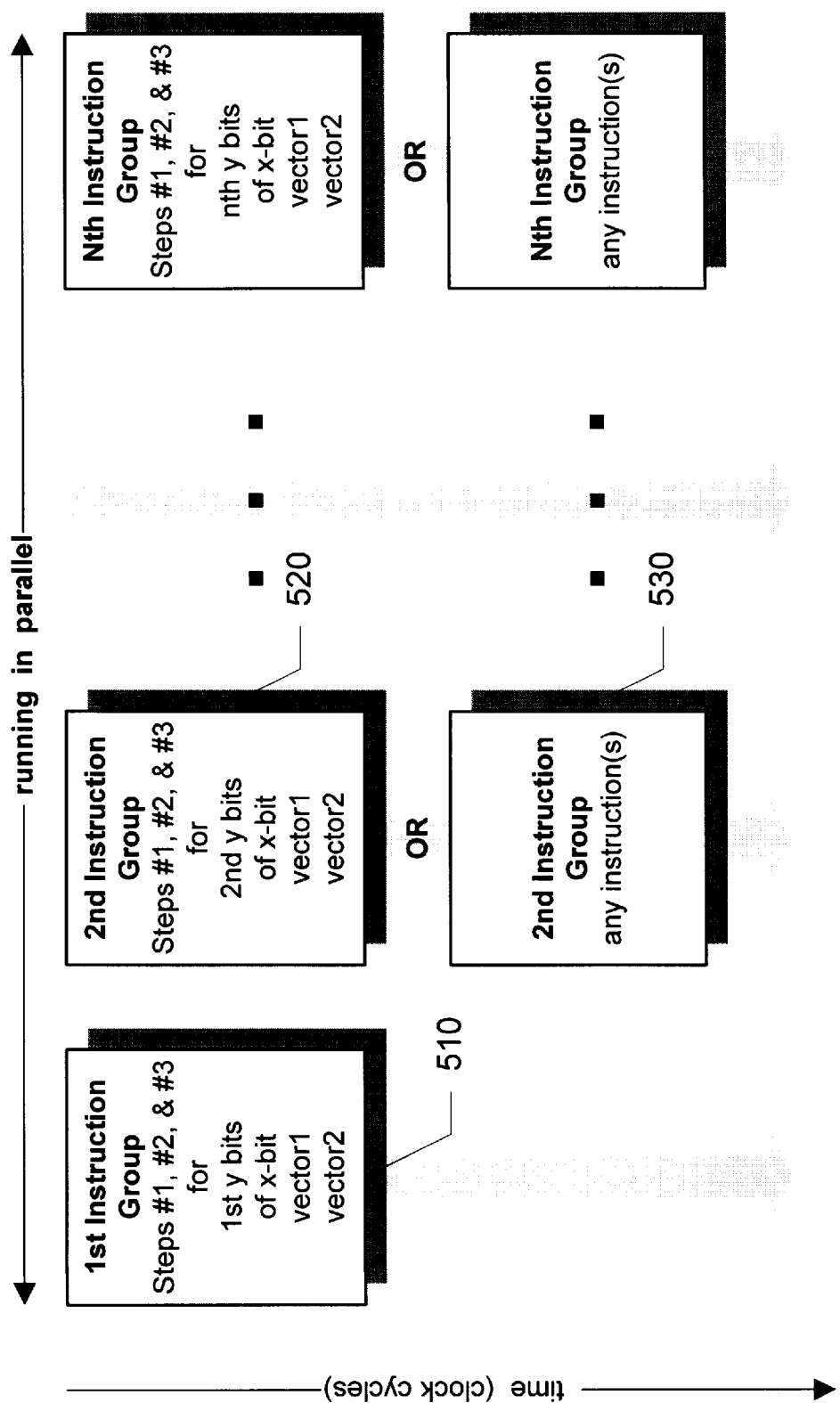
FIG. 5 illustrates parallel processing of multiple instructions according to another aspect of the present invention.

For example, referring now to FIG. 5, box 510, labeled "1st Instruction Group", represents steps #1, #2, and #3 for the 1st y bits of the x-bit vector1 and vector2 illustrated in FIG. 4. Boxes 520 and 530 represent alternate "2nd Instruction Groups" that might be started during the dead-time in execution of the "1st Instruction Group"; further, a "3rd Instruction Group" might be started, and so forth, depending on the amount of dead-time.

The "2nd Instruction Group" might carry out the steps of the present method for a second set of y bits of vector1 and vector2, as represented by the box 520 in FIG. 5; or it might carry out any other desired "Instruction Group", as represented by the box 530. The names "Instruction Group", "1st Instruction Group", and so forth, are arbitrary names, each referring to a group of one or more instructions. As will be apparent to those skilled in the art, in order for the "2nd Instruction Group" to properly begin execution during the dead-time in execution of the "1st Instruction Group", it must not be dependent on the outcome of the "1st Instruction Group"; if it is, then it must wait for completion of the "1st Instruction Group" before it can begin.

Figure 6:
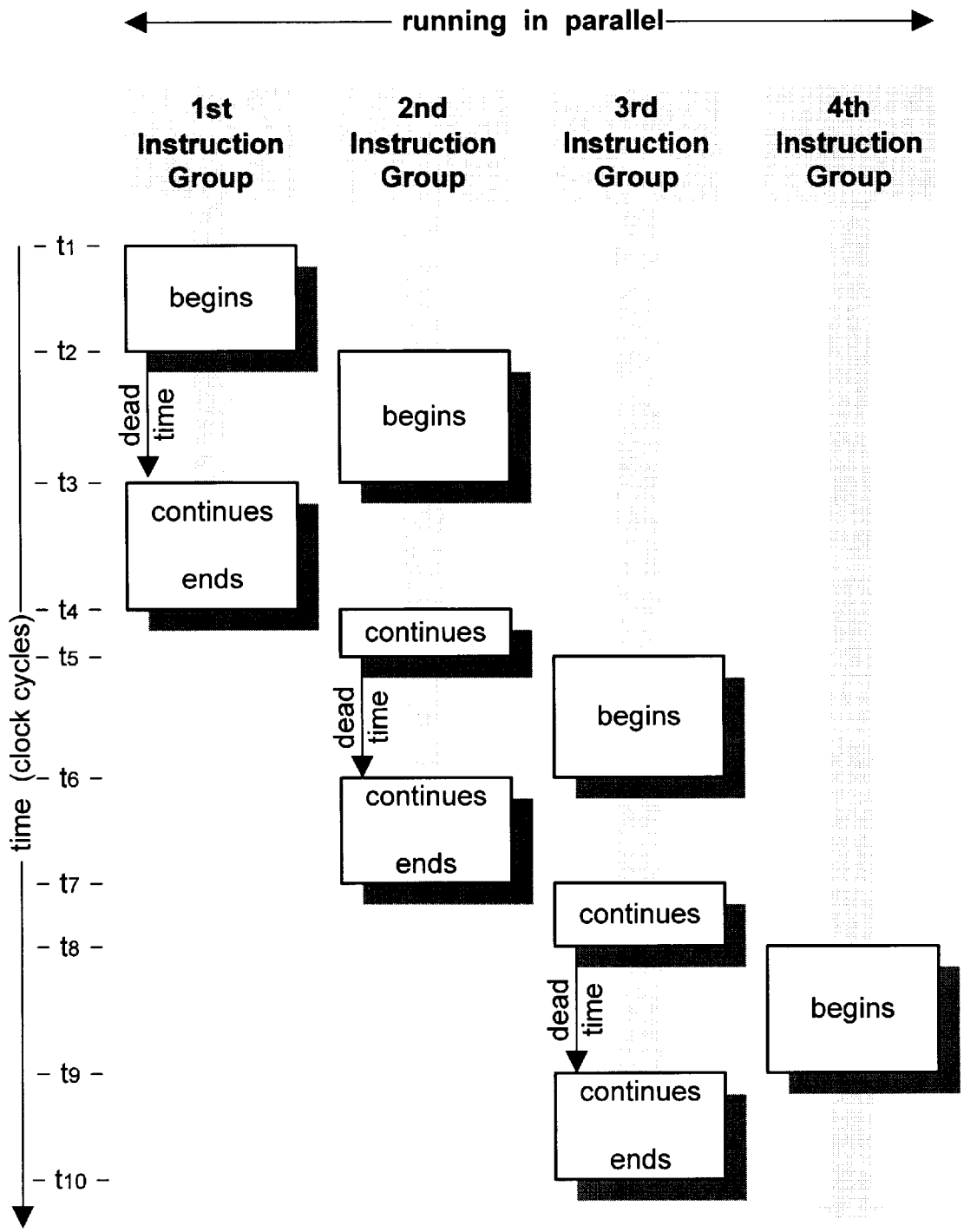
FIG. 6 illustrates interleaving multiple instructions according to yet another aspect of the present invention.

The interleaving of such "Instruction Groups" is better illustrated in FIG. 6, where four "Instruction Groups" are shown running in parallel. The "1st Instruction Group" begins at a time $t_1$ and starts to experience a dead-time at time $t_2$. The "2nd Instruction Group" begins execution during that dead-time and continues executing to a time $t_3$, at which time the "1st Instruction Group" continues its execution.

As illustrated in FIG. 6, the "1st Instruction Group" continues execution, and ends at time $t_4$. The "2nd Instruction Group" then continues its execution, and experiences a dead-time at time $t_5$. The "3rd Instruction Group" then begins at time t5 and continues execution to time $t_6$, at which time the "2nd Instruction Group" continues its execution, and so forth. Thus the "Instruction Groups" are interleaved such that one executes during the dead-time of another. The present method, by eliminating the multiple branches of the prior art linear and tree methods, makes it easier to have program instructions execute in an order better for concurrent execution (sometimes also called concurrency or parallelism), whether the instructions are manually re-ordered by the programmer or automatically re-ordered by the computer.

The present invention may be advantageously used in a compiler so that all case statements in application programs compiled by that compiler can benefit from the present invention. The present invention may also be encoded in assembly language that instructs the computer to carry out the controls dictated by the assembly language implementation of the present method. The present invention may be contained in any computer readable medium, or in any other manner be used to cause a computer to function in the fashion of the present method.

To determine the performance of the present invention relative to the prior art linear method and the prior art tree method, certain tests were performed. These tests are limited to the specific experiments run, but tend to indicate that the method of the present invention illustrated in FIGS. 3 and 4 matches or out performs the prior art linear method generally illustrated in FIG. 1, and out performs the prior art tree method generally illustrated in FIG. 2. Additionally, the present method as illustrated in FIGS. 5 and 6 out performs both the prior art linear and the prior art tree method.

Three tests were conducted. In each test there were 40 case values. In each test there were 1200 case statement function calls, each with a particular selection key. All measurements were averaged over the 1200 function calls.

In the first test, the selection key, for each of the 1200 function calls, was randomly selected from across the range of case values. The results of this test are summarized in Table 3.

TABLE 3

Test 1

| Attributes Measured | Linear Method | Tree Method | Present Method |
|---|---|---|---|
| Macro-Instructions | 39 | 16 | 29 |
| % of Branches Mispredicted | 0.1% | 5% | 0% |
| % of Total time in Mispredicted Branches | 0.91% | 36% | 0% |
| Total Clocks | 27 | 28 | 27 |
| Speedup relative to linear implementation | 1.0 | 0.96 | 1.0 |

In the second test, the selection key was held constant for each of the 1200 function calls. This test was most favorable to the prior art tree method. The results of this test are summarized in Table 4.

TABLE 4

Test 2

| Attributes Measured | Linear Method | Tree Method | Present Method |
|---|---|---|---|
| Macro-Instructions | 39 | 19 | 29 |
| % of Branches Mispredicted | 0.01% | 0.06% | 0% |
| % of Total time in Mispredicted Branches | 0.09% | 0.4% | 0% |
| Total Clocks | 27 | 24 | 27 |
| Speedup relative to linear implementation | 1.0 | 1.12 | 1.0 |

In the third test, the selection key was varied randomly across the different paths in the tree, for each of the 1200 function calls. That is, the selection key choices were evenly distributed among all of the paths in the tree, and in each particular path the selection key was randomly chosen. The inventors presently believe that this test is the more appropriate because it is believed to be more representative of real life computing situations. The results of this test are summarized in Table 5.

TABLE 5

Test 3

| Attributes Measured | Linear Method | Tree Method | Present Method |
| --- | --- | --- | --- |
| Macro-Instructions | 31 | 15 | 29 |
| % of Branches Mispredicted | 3.2% | 12% | 0% |
| % of Total time in Mispredicted Branches | 23% | 46% | 0% |
| Total Clocks | 28 | 33 | 27 |
| Speedup relative to linear implementation | 1.0 | 0.85 | 1.04 |

The results of all three tests are summarized in Table 6.

TABLE 6

Performance Relative to linear Technique

| | Tree Method | Present Method | Present Interleaved Method-2 "Instruction Groups" |
| --- | --- | --- | --- |
| Test 1 | 0.96 | 1.0 | 1.35 |
| Test 2 | 1.12 | 1.0 | 1.35 |
| Test 3 | 0.85 | 1.04 | 1.40 |

In Table 6, all numbers are relative to those achieved with the prior art linear method; consequently, the numbers recited in Table 6 indicate performance relative to the linear method. For example, in Test 3 the prior art tree method was 15% slower than the linear method (hence the value 0.85 in Table 6), and the present method illustrated in FIGS. 3 and 4 was 4% faster than the linear method (hence the value 1.04 in Table 6). Table 6 further shows for Test 3, that when two "Instruction Groups" are interleaved according to the present invention (as illustrated in FIGS. 5 and 6, and boxes 510 and 520 of FIG. 5), the present method is 40% faster than the prior art linear method.

There are tradeoffs between the present method as illustrated in FIGS. 3 and 4, and the prior art linear method as generally illustrated in FIG. 1 and the prior art tree method as generally illustrated in FIG. 2.

The linear method results in better branch prediction if the default case is most likely to occur and, in that situation, nearly equals the zero branch mispredictions of the present method. The linear case, however, potentially schedules more instructions, and its performance is dependent on the input stream characteristics.

The tree method potentially schedules fewer instructions than the linear method, and exploits specific characteristics of the case values themselves. The performance of the tree method, however, is dependent on the input stream characteristics.

The present method as illustrated in FIGS. 3 and 4, and as illustrated in FIGS. 5 and 6, performs independent of the input stream characteristics, although it potentially schedules more instructions.

Thus, the primary performance tradeoff is branch mispredictions versus additional instructions. In modem day microprocessors, branch mispredictions are costly and decrease computer performance. The present invention results in zero branch mispredictions, and consequently zero time is spent in mispredicted branches. In Test 3, as summarized in Table 5, the prior art linear method spent 23% of its time in mispredicted branches, and the tree method 46% of its time.

Thus the present invention eliminates the jumping around of the prior art linear technique and the prior art tree technique, and causes the computer to efficiently go to the location of the next instruction to be executed. This aspect of the present invention can be advantageously used to control microprocessors capable of performing multiple operations in parallel, as well as microprocessors that do not have that capability. The present invention permits parallel operations because it is known that there will be no branch mispredictions. This aspect of the present invention can be advantageously used to control microprocesses capable of performing multiple operations in parallel.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer readable medium for storing instructions, which when executed by a computer, causes the computer to select one action from among alternative actions by performing the steps of:

comparing a selection key with at least two values corresponding to alternative actions, comparing the selection key to each said value in parallel, and creating for each such comparison a match or no match indication;

logically ANDing the at least two indications resulting from the comparing step with an equal quantity of values corresponding to consecutive index numbers, and creating for each such logical ANDing an index indication;

logically ORing each of the index indications, and producing an index corresponding to the selected one action or to a default action; and branching to the action identified by the index.

2. A computer readable medium for storing instructions, which when executed by a computer, causes the computer to perform the steps of:

creating a first vector of valves corresponding to alternative actions;

receiving a selection key;

comparing the selection key with ieast two values of the first vector, comparing the selection key to each said value in parallel, and creating for each such comparison a match or no match indication;

creating a second vector of values corresponding to consecutive index numbers;

logically ANDing the at least two indications resulting from the comparing step with an equal quantity of corresponding values of the second vector, and creating for each such logical ANDing an index indication;

logically ORing each of the index indications and producing an index corresponding to a selected action or to a default action, and updating a value in a register with that index; and branching to the action identified by the index in the register.

3. The computer readable medium of claim 2 wherein the instructions for comparing comprise instructions for comparing the selection key to each of four values of the first vector, in parallel.

4. The computer readable medium of claim 2 wherein the instructions for comparing comprise instructions for comparing the selection key to each of eight values of the first vector, in parallel.

5. The computer readable medium of claim 2 wherein the instructions for comparing and for logically ANDing and for logically ORing comprise instructions comparing and logically ANDing and logically ORing a first set of at least two values and a second set of at least two values.

6. The computer readable medium of claim 5 wherein the instructions comprise instructions for interleaving the comparing and/or logically ANDing and/or logically ORing of the first set of at least two values with the comparing and/or logically ANDing and/or logically ORing of the second set of at least two values.

7. A method for causing a computer to efficiently select one action, from among alternative actions, based on the value of a selection key, comprising the steps of:

creating a first vector of values corresponding to alternative actions;

receiving a selection key;

comparing the selection key with at least two values of the first vector, comparing the selection key to each said value in parallel, and creating for each such comparison a match or no match indication;

creating a second vector of values corresponding to consecutive index numbers;

logically ANDing the at least two indications resulting from the comparing step with an equal quantity of corresponding values of the second vector, and creating for each such logical ANDing an index indication;

logically ORing each of the index indications and producing an index corresponding to a selected action or to a default action, and updating a value in a register with that index; and branching to the action identified by the index in the register.

8. The method of claim 7 wherein the comparing step and the logical ANDing step and the logical ORing step are each conducted for a first set of at least two values and for a second set of at least two values.

9. The method of claim 8:

wherein when the comparing step and/or the logical ANDing step and/or the logical ORing step are conducted for the first set of at least two values there is a first dead-time; and further wherein the comparing step and/or the logically ANDing step and/or the logical ORing step for the second set of at least two values is conducted, at least in part, during said first dead-time.

10. The method of claim 7:

wherein the method includes a first dead-time; and further wherein a second method is executed, at least in part, during at least a portion of said first dead-time.

11. The method of claim 7 wherein the at least two values includes four values.

12. The method of claim 7 wherein the at least two values includes eight values.

13. The method of claim 11 wherein the selection key contains 16 bits, and each of the four values contains 16 bits.

14. The method of claim 12 wherein the selection key contains 8 bits, and each of the eight values contains 8 bits.

15. The method of claim 7 wherein the at least two values contain, in total, 64 bits.

16. The method of claim 7 wherein the at least two values contain, in total, 128 bits.

17. A computer readable medium for storing instructions, which when executed by a computer, causes the computer to select one action from among alternative actions by performing the steps of:

comparing a selection key with a first set of y values of a set of x values corresponding to x alternative actions, where y is less than x, comparing the selection key to each of said y values in parallel, and creating for each such comparison a match or no match indication;

logically ANDing the y indications resulting from the comparing step with an equal quantity of values corresponding to consecutive index numbers, and creating for each such logical ANDing an index indication;

logically ORing each of the index indications, and producing an index corresponding to the selected one action or to a default action;

repeating the comparing, logical ANDing, and logical ORing steps for another set of y values, until all x values have been compared to the selection key; and branching to the action identified by the index.

18. A computer readable medium for storing instructions, which when executed by a computer, causes the computer to perform the steps of:

creating an x-element first vector of x values corresponding to x alternative actions;

receiving a selection key;

comparing the selection key with a first set of y values of the first vector, where y is less than x, comparing the selection key to each of said y values in parallel, and creating for each such comparison a match or no match indication;

creating a second vector of values corresponding to x consecutive index numbers;

logically ANDing the y indications resulting from the comparing step with an equal quantity of corresponding values of the second vector, and creating for each such logical ANDing an index indication;

logically ORing each of the index indications, and producing an index corresponding to a selected action or to a default action;

repeating the comparing, logical ANDing, and logical ORing steps for another set of y values, until all x values have been compared to the selection key; and branching to the action identified by the index.

19. The computer readable medium of claim 18 wherein the instructions comprise instructions for interleaving the comparing and/or logically ANDing and/or logically ORing of the first set of y values with the comparing and/or logically ANDing and/or logically ORing of the another set of y values.

20. A method for causing a computer to efficiently select one action, from among alternative actions, based on the value of a selection key, comprising the steps of:

creating an x-element first vector of x values corresponding to x alternative actions;

receiving a selection key;

comparing the selection key with a first set of y values of the first vector, where y is less than x, comparing the selection key to each of said y values in parallel, and creating for each such comparison a match or no match indication;

creating a second vector of values corresponding to x consecutive index numbers;

logically ANDing the y indications resulting from the comparing step with an equal quantity of corresponding values of the second vector, and creating for each such logical ANDing an index indication;

logically ORing each of the index indications and producing an index corresponding to a selected action or a default action, and updating a value in a register with that index;

repeating the comparing, logical ANDing, and logical ORing steps for another set of y values, until all x values have been compared to the selection key; and branching to the action identified by the index in the register.

21. The method of claim 20:

wherein when the comparing step and/or the logical ANDing step and/or the logical ORing step are conducted for the first set of y values there is a first dead-time; and further wherein the comparing step and/or the logically ANDing step and/or the logical ORing step for the another set of y values is conducted, at least in part, during said first dead-time.

22. The method of claim 20:

wherein the method includes a first dead-time; and further wherein a second method is executed, at least in part, during at least a portion of said first dead-time.

23. The method of claim 20 wherein the selection key contains 16 bits, and each of the y values contains 16 bits.

24. The method of claim 20 wherein the selection key contains 8 bits, and each of the y values contains 8 bits.

25. A computer system, comprising a microprocessor and a medium containing instructions, wherein the instructions, when executed by the microprocessor, cause the computer system to perform the steps of:

comparing a selection key with at least two values corresponding to alternative actions, comparing the selection key to each said value in parallel, and creating for each such comparison a match or no match indication;

logically ANDing the at least two indications resulting from the comparing step with an equal quantity of values corresponding to consecutive index numbers, and creating for each such logical ANDing an index indication;

logically ORing each of the index indications, and producing an index corresponding to the selected one action or to a default action; and branching to the action identified by the index.

26. A computer system, comprising a microprocessor and a medium containing instructions, wherein the instructions, when executed by the microprocessor, cause the computer system to perform the steps of:

comparing a selection key with a first set of y values of a set of x values corresponding to x alternative actions, where y is less than x, comparing the selection key to each of said y values in parallel, and creating for each such comparison a match or no match indication;

logically ANDing they indications resulting from the comparing step with an equal quantity of values corresponding to consecutive index numbers, and creating for each such logical ANDing an index indication;

logically ORing each of the index indications, and producing an index corresponding to the selected one action or to a default action;

repeating the comparing, logical ANDing, and logical ORing steps for another set of y values, until all x values have been compared to the selection key; and branching to the action identified by the index.

* * * * *

UNITED STATES PATENT AND TRADEMARK OFFICE
CERTIFICATE OF CORRECTION

PATENT NO. : 6,026,487
DATED : February 15, 2000
INVENTOR(S) : Balasubramanian et al.

It is certified that error appears in the above-identified patent and that said Letters Patent is hereby corrected as shown below:

In column 4, at line 53, delete "modem" and insert --modern--.

In column 5, at line 24, delete "modem" and insert --modern--.

In column 12, at line 46, delete "ieast" and insert --least--.

Signed and Sealed this

Eighth Day of May, 2001

Attest:

NICHOLAS P. GODICI

Attesting Officer

Acting Director of the United States Patent and Trademark Office